(12) United States Patent
Chirayil (10) Patent No.: US 9,398,638 B2
(45) Date of Patent: Jul. 19, 2016

(54) COMMUNICATION TERMINAL AND METHOD FOR USING A COMMUNICATION SERVICE

(71) Applicant: Intel Mobile Communications GmbH, Neubiberg (DE)

(72) Inventor: Beena Joy Chirayil, Nuremberg (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 104 days.

(21) Appl. No.: 13/784,883

(22) Filed: Mar. 5, 2013

(65) Prior Publication Data

US 2014/0256302 A1 Sep. 11, 2014

(51) Int. Cl.
*H04W 88/06* (2009.01)
*H04W 48/18* (2009.01)
*H04W 8/18* (2009.01)

(52) U.S. Cl.
CPC .............. *H04W 88/06* (2013.01); *H04W 48/18* (2013.01); *H04W 8/183* (2013.01)

(58) Field of Classification Search
CPC ..... H04W 88/06; H04W 8/183; H04W 48/16; H04W 48/18; H04W 4/003; H04W 8/18
USPC ................................................. 455/418, 558
See application file for complete search history.

(56) References Cited

U.S. PATENT DOCUMENTS

| | | | | |
|---|---|---|---|---|
| 5,884,168 A | * | 3/1999 | Kolev et al. | 455/432.1 |
| 6,014,561 A | * | 1/2000 | Molne | 455/419 |
| 6,708,207 B1 | * | 3/2004 | Sabelhaus et al. | 709/223 |
| 8,825,091 B2 | * | 9/2014 | Lee et al. | 455/458 |
| 2003/0061503 A1 | * | 3/2003 | Katz et al. | 713/200 |
| 2006/0203802 A1 | * | 9/2006 | Chou et al. | 370/352 |
| 2010/0240414 A1 | | 9/2010 | Lotenberg | |
| 2012/0115545 A1 | * | 5/2012 | Middleton | 455/558 |
| 2013/0203438 A1 | * | 8/2013 | Shin | 455/456.1 |
| 2014/0179373 A1 | * | 6/2014 | Hur et al. | 455/558 |

* cited by examiner

*Primary Examiner* — Kashif Siddiqui
*Assistant Examiner* — Minjung Kim (57) ABSTRACT

A communication terminal is described including a transceiver, a plurality of subscriber identity modules, wherein the transceiver is configured to receive a signal for each of the subscriber identity modules, a determiner configured to determine, for each subscriber identity module, a rating of the received signal and a controller configured to select a subscriber identity module from the plurality of subscriber identity modules for a communication service based on the ratings and configured to control the transceiver to use the communication service by means of the selected subscriber identity module.

15 Claims, 5 Drawing Sheets

COMMUNICATION TERMINAL AND METHOD FOR USING A COMMUNICATION SERVICE

TECHNICAL FIELD

The present disclosure relates to communication terminals and methods for using a communication service.

BACKGROUND

Modern communication terminals may include a plurality of subscriber identity modules. Accordingly, a mobile originated communication service may be initiated by a mobile terminal using one of a plurality of subscriber identity modules and, accordingly, one of a plurality of communication networks or radio cells. Efficient approaches to select a subscriber identity module for a reliable and sustainable communication service are desirable.

SUMMARY

A communication terminal is provided including a transceiver, a plurality of subscriber identity modules, wherein the transceiver is configured to receive a signal for each of the subscriber identity modules, a determiner configured to determine, for each subscriber identity module, a rating of the received signal and a controller configured to select a subscriber identity module from the plurality of subscriber identity modules for a communication service based on the ratings and configured to control the transceiver to use (and e.g. initiate) the communication service by means of the selected subscriber identity module.

Further, a method for using a communication service corresponding to the communication terminal described above is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
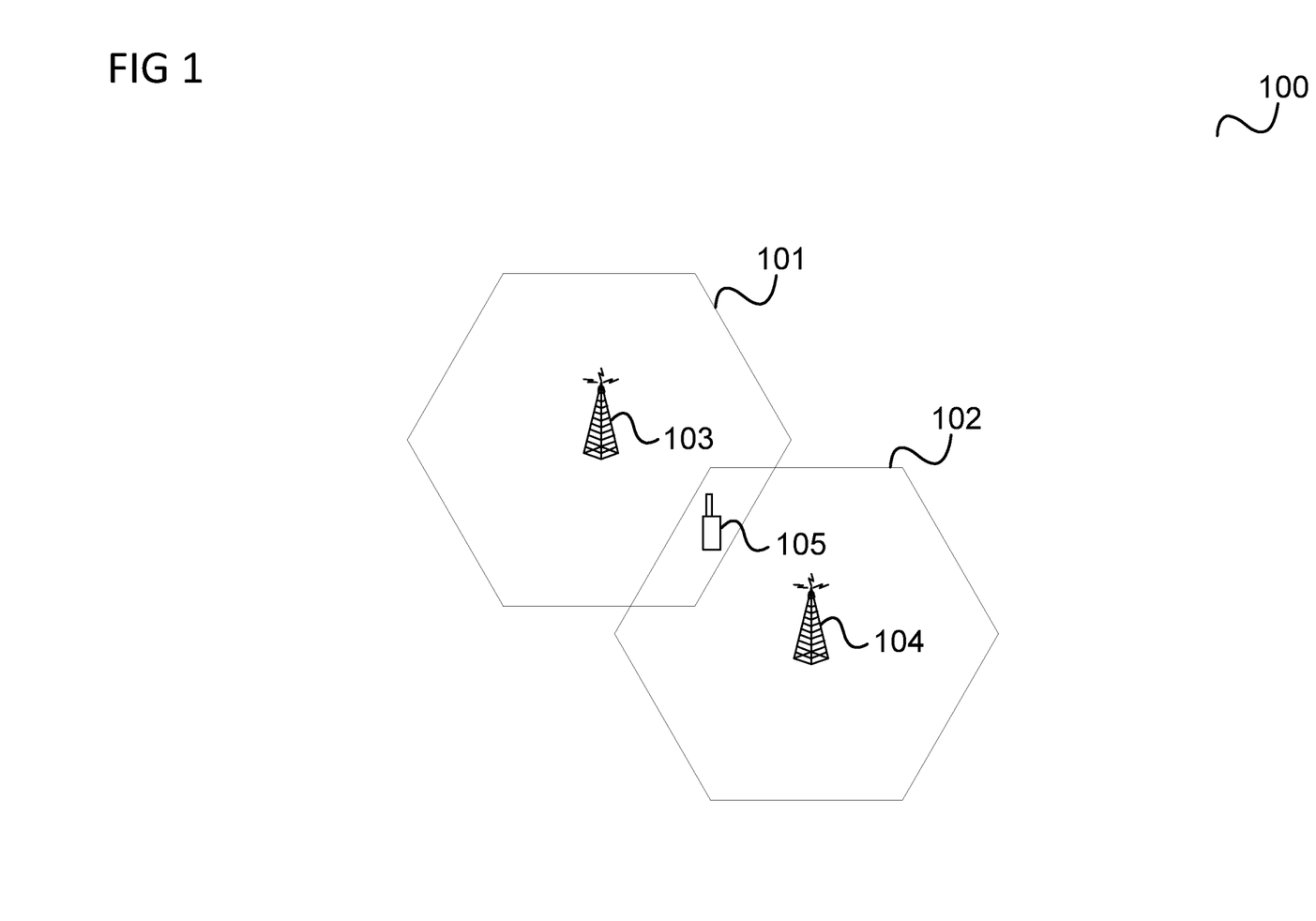
FIG. 1 shows a communication arrangement.

FIG. 1 shows a communication arrangement 100.

The communication arrangement 100 includes a first radio cell 101 and a second radio cell 102. The first radio cell 101 is operated by a first base station 103 and the second radio cell 102 is operated by a second base station 104. The first base station 103 is for example part of a radio access network of a first mobile communication network and the second base station 104 is for example part of a radio access network of a second mobile communication network. It is assumed that the first mobile communication network and the second communication network are different mobile communication networks, e.g. are operated by different operators and/or require separate subscriptions. It should however be noted that the following may also be applied to the first mobile communication network and the second communication network are the same mobile communication network.

The first mobile communication network and the second mobile communication network each may for example be cellular mobile communication networks according to various standards. For example, the mobile communication network is a 2G, 3G or a 4G wireless communication system, e.g. according to one of the following standards:

GSM: Global System for Mobile Communications, or GSM is a standard for mobile telephone systems. GSM utilizes a combination of frequency division multiple access (FDMA) and time division multiple access (TDMA) on the air interface. A GSM network includes several elements: the mobile station (MS), the subscriber identity module (SIM), the base transceiver station (BTS), the base station controller (BSC), the transcoding and rate adaptation unit (TRAU), the mobile services switching centre (MSC), the home location register (HLR), the visitor location register (VLR), and the equipment identity register (EIR). Together they form a public land mobile network (PLMN).

GPRS: GPRS (General Packet Radio Service) represents an evolution of the GSM standard, allowing data transmission in packet mode and providing higher throughputs as compared with the circuit-switched mode. This evolution is usually presented under the designation of 2.5G to point out that it is a transition technology between 2G and 3G. The GPRS network architecture reuses the GSM network nodes such as MSC/VLR, HLR, and BSS. New network nodes have been introduced for the transport of packet data. These nodes are the gateway GPRS support nodes (GGSN) and serving GPRS support nodes (SGSN). The subnetwork formed by the SGSNs and the GGSNs is called the GPRS core network.

UMTS (WCDMA & TD-SCDMA): Universal Mobile Telecommunications System (UMTS) is a third generation mobile cellular technology. UMTS employs wideband code division multiple access (W-CDMA) radio access technology to offer greater spectral efficiency and bandwidth to mobile network operators. UMTS provides several different terrestrial air interfaces, called UMTS Terrestrial Radio Access (UTRA). TD-SCDMA or Time Division Synchronous Code Division Multiple Access (also known as UTRA-TDD) uses Time Division Duplexing (TDD) at the air interface while WCDMA (also known as UTRA-FDD) uses the Frequency Division Duplexing (FDD) at the air interface.

CDMA2000: CDMA2000 is a family of 3G mobile technology standards, which use CDMA channel access, to send voice, data, and signaling data between mobile phones and cell sites.

LTE: LTE is a set of enhancements to the Universal Mobile Telecommunications System (UMTS) which was introduced in 3rd Generation Partnership Project (3GPP) Release 8. LTE supports peak download rates up to 299.6 Mbit/s and upload rates up to 75.4 Mbit/s depending on the user equipment (UE) category. It provides support for both FDD and TDD communication systems as well as half-duplex FDD with the same radio access technology The first radio cell 101 and the second radio cell 102 are assumed to overlap such that a mobile terminal 105 located in the overlap area of the first radio cell 101 and the second radio cell 102 can receive signals from both the first base station 103 and the second base station 104 and can use both the first communication network and the second communication network for communication.

For being able to use both the first communication systems and the second communication system, the mobile terminal 105 may include two (or more) subscriber identity modules (SIMs), e.g. GSM SIMs or USIMs (Universal Subscriber Identity Modules). In other words, the mobile terminal 105 may be a multi-SIM device supporting communication via two (or more) different mobile communication networks.

For example, there are currently many multi-SIM mobiles in market using either of the above wireless networks (LTE/3G or 2G network). In a multi-SIM mobile, when a mobile-originated (MO) activity is initiated, the SIM chosen is typically a default SIM set by the user or the user is prompted to select a SIM prior to each MO activity.

For example, a multi-SIM device (e.g. a multi-SIM mobile) may offer the user to initially select a default SIM or choose a SIM each time while initiating a mobile originated (MO) activity a MO call or MO SMS/MMS or a MO packet connection. However, the user default selection may not be the optimal choice for a sustainable and reliable service.

As described in the following, a device and a method may be provided that for example provide an optimal SIM selection in a multi-SIM multi-mode (or non-multimode) mobile, e.g. in a mobile communication system according to any one of the wireless network types as described above. For example, a SIM in a multi-SIM mobile to be used for a communication service is selected based on certain dynamic parameters. For example the (optimal) SIM in a multi-SIM device to be used for a communication service is selected based on a set of dynamic parameters, which can guarantee a reliable and sustainable service.

Figure 2:
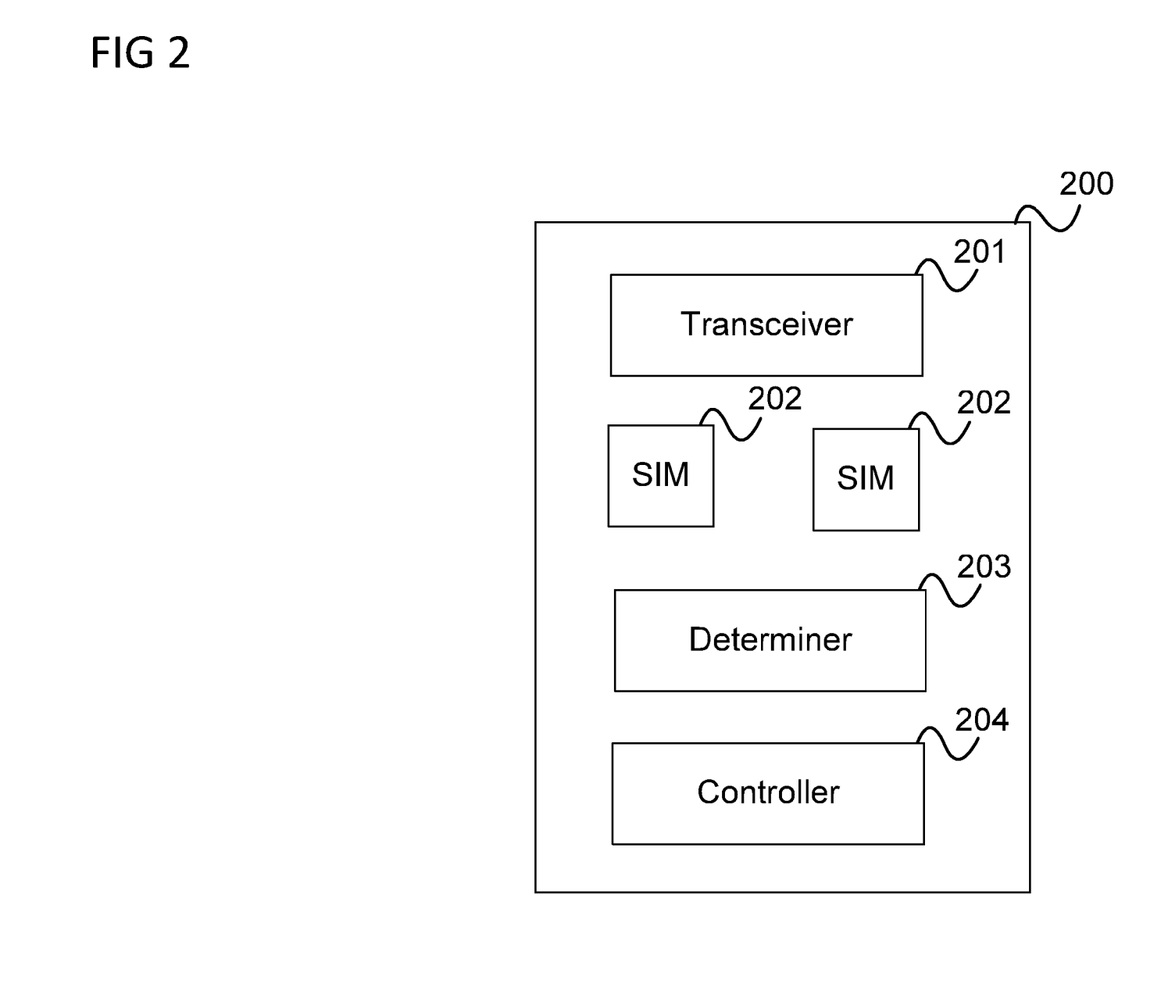
FIG. 2 shows a communication terminal.

FIG. 2 shows a communication terminal 200.

The communication terminal 200 includes a transceiver 201 and a plurality of subscriber identity modules 202, wherein the transceiver is configured to receive a signal for each of the subscriber identity modules.

The communication terminal 200 further includes a determiner 203 configured to determine, for each subscriber identity module 202, a rating of the received signal.

Additionally, the communication terminal 200 includes a controller 204 configured to select a subscriber identity module from the plurality of subscriber identity modules 202 for a communication service based on the ratings and configured to control the transceiver to use the communication service by means of the selected subscriber identity module.

In other words, a terminal selects a subscriber identity module (e.g. a SIM or a USIM) which is to be used for a communication service, e.g. which is to be used for initiating the communication service, based on a rating of a signal received for (e.g. by means of) the subscriber identity module. The rating of the signal received for a subscriber identity module can be seen as an indication of an expected performance of a communication using the subscriber identity module.

For example, a mobile terminal performs a selection of a SIM based on dynamic channel conditions for a mobile originated activity. For example the selection is performed such that it is ensured that the mobile originated activity (e.g. voice call, packet data, MMS or SMS) is initiated on the most reliable cell available to the terminal Thus, it may for example be avoided that packet data connections are dropped and re-established frequently. Further, the fastest data connection available among the SIMs may for example be provided in this way.

In practice, it has been observed that even if the two SIMs are of the same network operator and enclosed in the same device (mobile terminal), they may camp on different serving cells. A mobile terminal 105 having executing a selection logic/algorithm select the SIM as described above, may consider the SIMs of the same network operator, camping on different serving cells, in the same way as SIMs of two different network operators, and thereby select a SIM for a communication service from among SIMs associated with the same operator.

The controller is for example configured to select the (or one of the) subscriber identity modules for which the transceiver has received the signal with the highest rating.

The rating of the signal is for example the signal strength at which the transceiver has received the signal or quality of the signal (considering fading and/or interference) or a combination of both (e.g. the pair of signal strength and signal quality or a value reflecting a combination of both).

The transceiver is for example configured to receive, for each of the subscriber identity modules, the signal via a communication channel associated with the subscriber identity module.

For example, for each subscriber identity module, the terminal camps on a radio cell and the communication channel associated with the subscriber identity module is a downlink channel (e.g. a broadcast channel or a paging channel) of the radio cell.

The controller is for example configured to control the transceiver to intiate the communication service (e.g. by means of a request) by means of the selected subscriber identity module.

Each subscriber identity module of the plurality of subscriber identity modules is for example associated with a cellular mobile communication network.

For example, the subscriber identity module identifies the communication terminal as a subscriber terminal of the cellular mobile communication network associated with the subscriber identity module.

The subscriber identity modules are for example associated with different cellular mobile communication networks.

The subscriber identity modules may also at least partially be associated with the same cellular mobile communication network.

The controller is for example configured to control the transceiver to use (and e.g. initiate) the communication service by means of the cellular mobile communication network associated with the selected subscriber identity module. In other words, using the communication service may for example include initiating the communication service by means of the selected subscriber identity module.

Using the communication service by means of the selected subscriber identity module may for example include using the subscriber identity module to identify the mobile when using the communication service.

Using the communication service by means of the selected subscriber identity module may for example include using the subscriber identity module to perform encryption and decryption of data exchanged in context of the communication service.

The communication service is for example a dedicated communication connection.

The communication connection is for example a circuit switched communication connection or a packet switched communication connection.

The communication service may for example be exchange of useful data.

For example, the communication service is a voice call or a messaging service or a video call.

Figure 3:
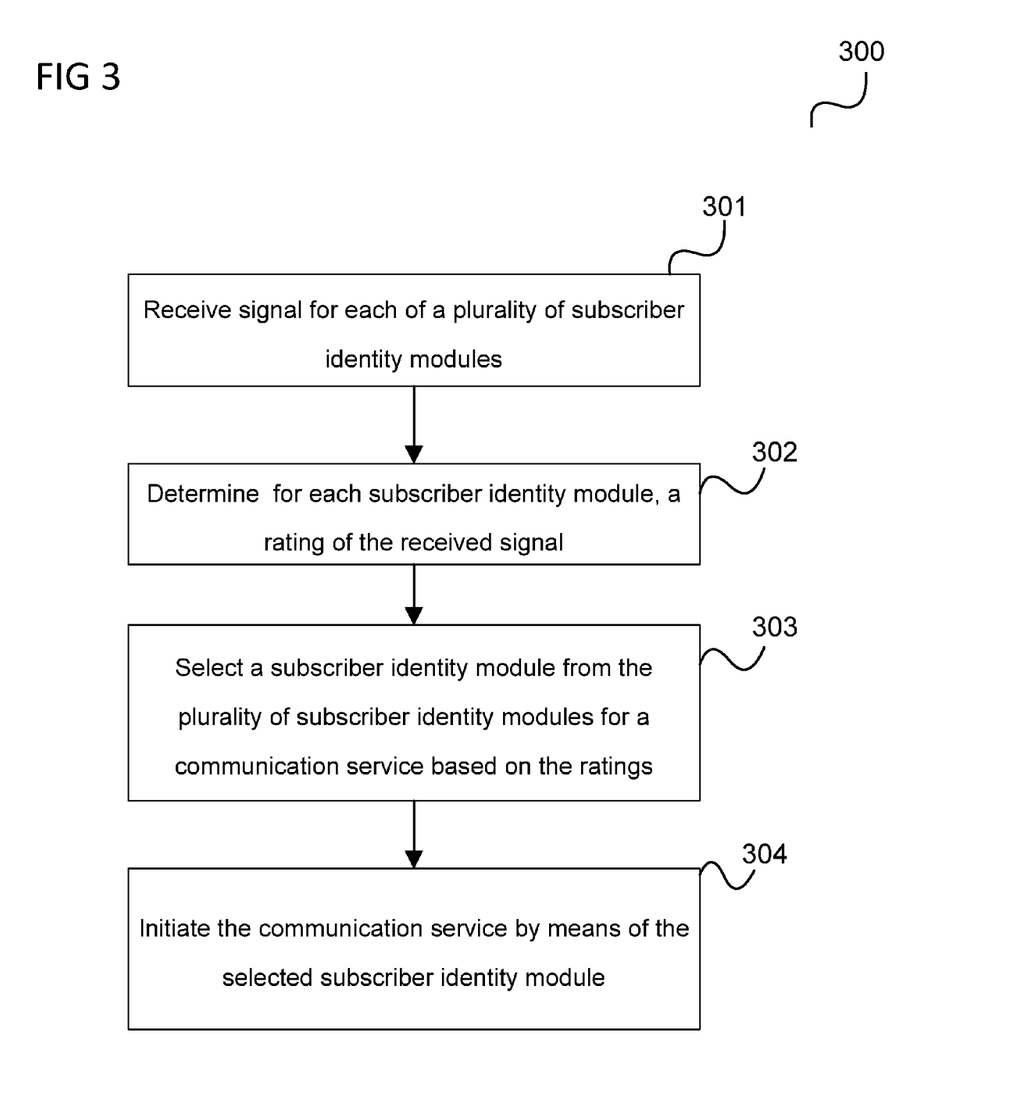
FIG. 3 shows a flow diagram illustrating a method for using a communication service.

The communication terminal for example carries out a method as illustrated in FIG. 3.

FIG. 3 shows a flow diagram 300.

The flow diagram 300 illustrates a method for using a communication service, for example carried out by a communication terminal.

In 301, the communication terminal receives a signal for each of a plurality of subscriber identity modules.

In 302, the communication terminal determines, for each subscriber identity module, a rating of the received signal.

In 303, the communication terminal selects a subscriber identity module from the plurality of subscriber identity modules for a communication service based on the ratings.

In 304, the communication terminal uses the communication service by means of the selected subscriber identity module.

It should be noted that examples described in context with the communication terminal 200 are analogously valid for the method illustrated in FIG. 3 and vice versa.

The components of the communication terminal (e.g. the transceiver, the determiner and the controller) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit".

In the following, examples are described in more detail.

In the following example, e.g. in addition to an existing functionality of SIM selection, an additional option for the user to enable "optimal SIM selection" is added. According to this option, for example, the SIM for a communication service, e.g. the immediately following mobile originated (MO) activity (e.g. voice call/SMS/MMS/packet data/video call) is selected from the SIMs installed in the communication terminal based on a combination of channel parameters like (i) for each SIM, the signal strength of a signal received via the serving cell onto which the SIMs is camped upon;
(ii) for each SIM, the signal quality of a signal received via the serving cell (e.g. by evaluation of the decoding errors for the downlink channels).
(iii) for each SIM, the fading and interference characteristics of the downlink channel In the following, a flow is described in which an option for the user (e.g. of the mobile terminal 105) is provided to "Enable Optimal SIM" Selection and, if the option is activated, a SIM for a communication service is selected based on channel parameters.

Figure 4:
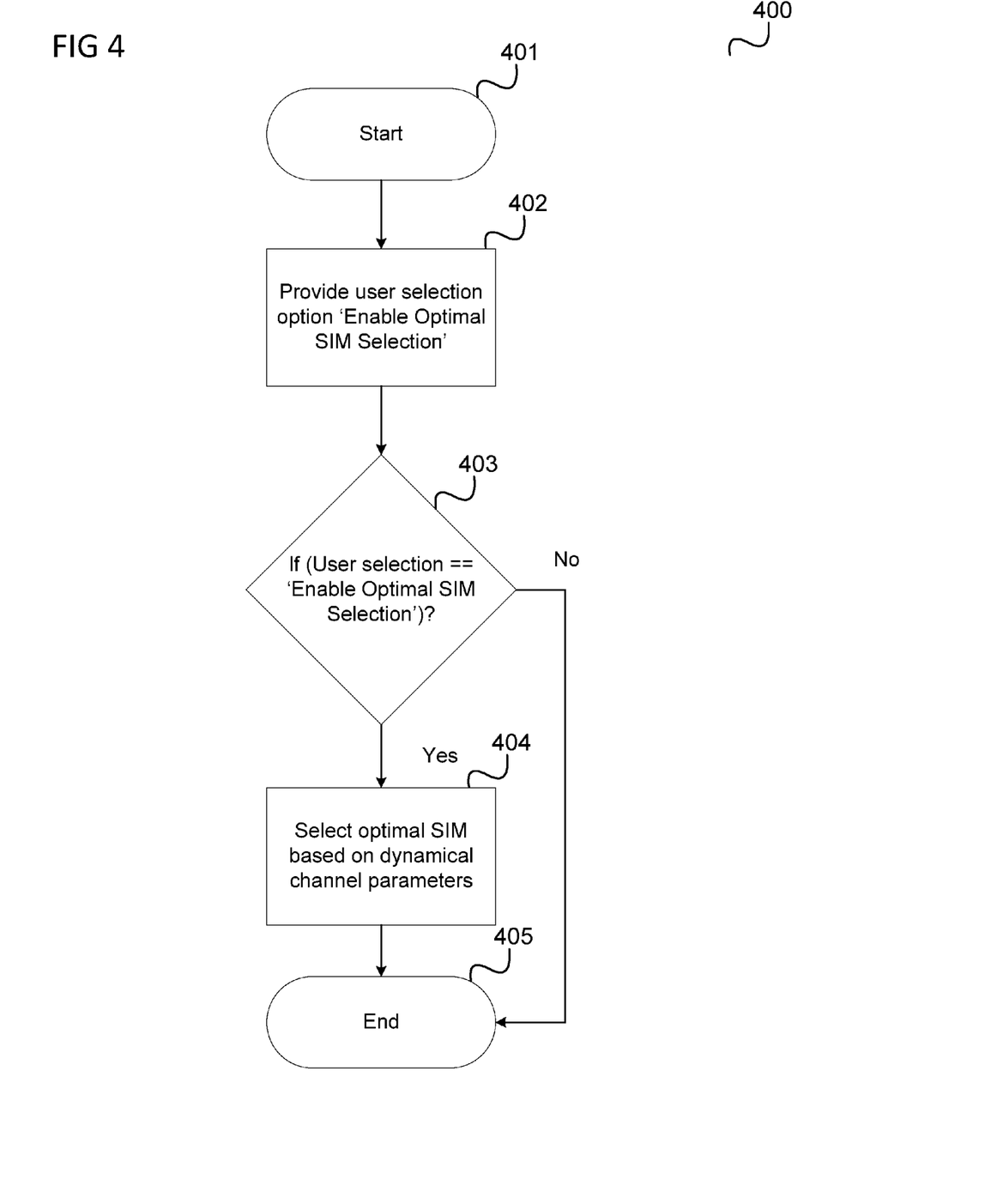
FIG. 4 shows a flow diagram illustrating a flow for selecting a SIM depending on a user setting.

FIG. 4 shows a flow diagram 400.

The flow starts in 401.

In 402, the mobile terminal 105 provides the user to "enable optimal SIM" selection. This option may for example presented to the user at start-up of the mobile terminal 105 or when an additional or new SIM has been installed in the mobile terminal 105 or in one of the existing settings option for the mobile terminal.

In 403, when a communication service should be used, e.g. when the user wishes to establish a voice call, SMS, MMS, video call or a packet data connection, the mobile terminal 105 checks whether the "option enable optimal SIM selection" has been activated. If this is not the case, the procedure ends in 405 and a default SIM or the primary SIM is for example selected as the SIM for the communication service.

If the "option enable optimal SIM selection" has been activated, the mobile terminal 105, in 404, selects the SIM for the communication service (e.g. the immediately following activity) automatically by evaluating one or more of the channel parameters such as signal strength, signal quality, fading and interference characteristics of signals received for the SIMs of the mobile terminal 105.

Figure 5:
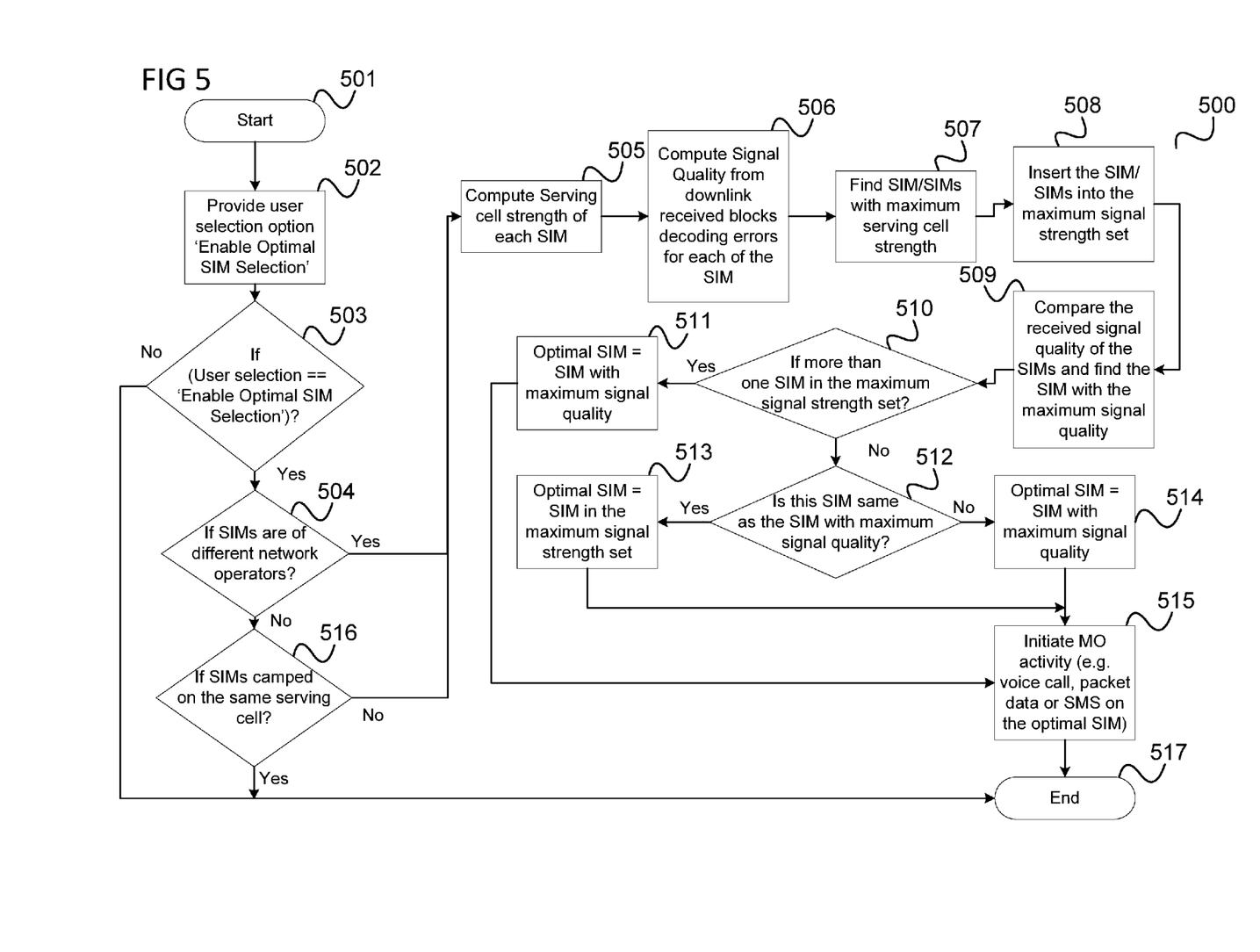
FIG. 5 shows a flow diagram illustrating a flow for selecting a SIM based on channel parameters.

A further example for a flow is given in FIG. 5.

FIG. 5 shows a flow diagram 500.

The flow illustrated in FIG. 5 is based on an approach where the channel parameters considered are signal strength and signal quality and the decision is also based on the operators of two SIMs of a dual-SIM phone (e.g. corresponding to the mobile terminal 105).

The process starts with 501, e.g. upon start-up of the mobile terminal 105.

In 502, the mobile terminal 105 provides the user with a selection option to 'Enable Optimal SIM Selection' and proceeds with 503.

In 503, if the user selects 'Enable Optimal SIM Selection', the flow proceeds with 504. Else, the flow proceeds with 517.

In 504, the mobile terminal 105 checks whether the SIMs are from different network operators (e.g. are associated with different communication networks). If this is the case, the flow continues with 505. If this is not the case, the flow continues with 516.

In 505, the mobile terminal 105 computes the serving cell strength of each SIM and proceeds with 506.

In 506, the mobile terminal 105 computes the signal quality from the paging decoding errors for each of the SIMs and proceeds with 507.

In 507, the mobile terminal 105 finds the SIM(s) with the maximum serving cell strength and puts these SIM(s) in a maximum signal strength set in 508. It should be noted that there may be multiple SIMs with the same maximum signal strength. Then, the mobile terminal 105 proceeds with 509.

In 509, the mobile terminal 105 compares the received signal quality of the SIMs and finds the SIM with the maximum signal quality and proceeds with 510.

In 510, the mobile terminal 105 checks whether more than one SIM are in the maximum signal strength set.

If this is the case, the mobile terminal 105 selects the SIM with the maximum signal quality as the optimal SIM among them in 511 and proceeds with 515.

If there is only one SIM is in the maximum signal strength set, the mobile terminal 105 in 512 checks whether this SIM is same as the SIM with the maximum signal quality. If this is the case, the flow proceeds with 513. If this is not the case the flow proceeds with 514.

In 513, the mobile terminal 105 selects the optimal SIM as the SIM in the maximal signal strength set, equal to the SIM with maximum signal quality and proceeds with 515.

In 514, the mobile terminal 105 selects the optimal SIM as the SIM with maximal signal quality and proceeds with 515.

In 515, the mobile terminal 105 selects the optimal SIM as the SIM for initiating the next mobile originated service. The optimal SIM may also be chosen as the first (SIM1) of the mobile terminal or the primary or the default SIM and continues with 517.

In 516, if the SIMs are of the same network operator, check whether the SIMs are camped on different serving cells (in practice, this can happen), If this is the case, the flow proceeds with 505. Else, it proceeds with 517.

In 517, the mobile terminal initiates the mobile originated activity (e.g. voice call/SMS/MMS/video call/packet data) on the optimal SIM.

It should be noted that the SIM selection can be made more reliable by using other channel parameters such as interference and fading effects such that the selected SIM not only has maximum signal strength and quality, but also least interference and fading effects thereby ensuring a reliable and optimal connection. Or alternatively, signal quality may also be setup to include the effects of interference and fading.

It should further be noted that for example, irrespective of whether the user has chosen the "Enable Optimal SIM Selection" feature to be enabled or not, if the dual SIM mobile (or multi-SIM mobile) is out of coverage area for one of its SIMs or no PLMN could be selected (i.e. no network can be detected for this SIM) then the mobile terminal may select the other SIM (or one of the other SIM) for any mobile originated activity. For example, if a signal is received for a SIM which does not allow detection of a network for this SIM, the SIM is not selected for the communication service. This can be seen as the rating of the signal being set to the lowest value possible.

For a packet-data connections, a user may typically set up a connection priority per SIM (or per network operator). For SIM selection according to one example, the user for example sets up two connections at the same priority the mobile terminal 105 chooses the SIM by means of which the packet data connection is provided amongst them, e.g. as described with reference to FIG. 5.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication terminal comprising:
   a transceiver;
   a plurality of subscriber identity modules, wherein the transceiver is configured to receive a signal for each of the subscriber identity modules;
   a determiner configured to determine, for each subscriber identity module, a rating of the received signal; and
   a controller configured to select a subscriber identity module from the plurality of subscriber identity modules for a communication service based on the ratings and configured to control the transceiver to use the communication service by means of the selected subscriber identity module, wherein the controller determines whether more than one subscriber identity modules are in a maximum signal strength set and, if this is the case, selects the subscriber identity module with a maximum signal quality determined based on paging decoding errors out of the maximum signal strength set, and, if there is only one subscriber identity module in the maximum signal strength set, selects the subscriber identity module with the maximum signal quality determined based on the paging decoding errors;
   wherein each subscriber identity module of the plurality of subscriber identity modules is associated with a cellular mobile communication network;
   wherein the subscriber identity module identifies the communication terminal as a subscriber terminal of the cellular mobile communication network associated with the subscriber identity module;
   wherein the subscriber identity modules are at least partially associated with the same cellular mobile communication network; and
   wherein the determiner is further configured to determine whether the subscriber identity modules are camped on different serving cells of the same cellular network and to determine the rating of the received signal if the subscriber identity modules are camped on different serving cells of the same cellular network.

2. Communication terminal according to claim 1, wherein the controller is configured to select the subscriber identity module or one of the subscriber identity modules for which the transceiver has received the signal with the highest rating.

3. Communication terminal according to claim 1, wherein the rating of the signal is the signal strength at which the transceiver has received the signal or a quality of the signal or a combination of both.

4. Communication terminal according to claim 1, wherein the transceiver is configured to receive, for each of the subscriber identity modules, the signal via a communication channel associated with the subscriber identity module.

5. Communication terminal according to claim 4, wherein for each subscriber identity module, the terminal camps on a radio cell and the communication channel associated with the subscriber identity module is a downlink channel of the radio cell.

6. Communication terminal according to claim 1, wherein the controller is configured to control the transceiver to initiate the communication service by means of the selected subscriber identity module.

7. Communication terminal according to claim 1, wherein the subscriber identity modules are associated with different cellular mobile communication networks.

8. Communication terminal according to claim 1, wherein the controller is configured to control the transceiver to use the communication service by means of the cellular mobile communication network associated with selected subscriber identity module.

9. Communication terminal according to claim 1, wherein using the communication service by means of the selected subscriber identity module includes using the subscriber identity module to identify the mobile when using the communication service.

10. Communication terminal according to claim 1, wherein using the communication service by means of the selected subscriber identity module includes using the subscriber identity module to perform encryption and decryption of data exchanged in context of the communication service.

11. Communication terminal according to claim 1, wherein the communication service is dedicated communication connection.

12. Communication terminal according to claim 1, wherein the communication connection is a circuit switched communication connection or a packet switched communication connection.

13. Communication terminal according to claim 1, wherein the communication service is exchange of useful data.

14. Communication terminal according to claim 1, wherein the communication service is a voice call or video call or a messaging service.

15. A method for using a communication service comprising: receiving a signal for each of a plurality of subscriber identity modules; determining, for each subscriber identity module, a rating of the received signal; selecting a subscriber identity module from the plurality of subscriber identity modules for a communication service based on the ratings, wherein it is determined whether more than one subscriber identity modules are in a maximum signal strength set and, if this is the case, the subscriber identity module with a maximum signal quality determined based on paging decoding errors out of the maximum signal strength set is selected, and, if there is only one subscriber identity module in the maximum signal strength set, the subscriber identity module with the maximum signal quality determined based on the paging decoding errors is selected; and using the communication service by means of the selected subscriber identity module;

wherein each subscriber identity module of the plurality of subscriber identity modules is associated with a cellular mobile communication network;

wherein the subscriber identity module identifies the communication terminal as a subscriber terminal of the cellular mobile communication network associated with the subscriber identity module;

wherein the subscriber identity modules are at least partially associated with the same cellular mobile communication network; and determining whether the subscriber identity modules are camped on different serving cells of the same cellular network, wherein the rating of the received signal is determined if the subscriber identity modules are camped on different serving cells of the same cellular network.

* * * * *